United States Patent [19]

Wilkins

[11] Patent Number: 5,070,569
[45] Date of Patent: Dec. 10, 1991

[54] BRUSH CLEANER FOR SPROCKET CHAINS

[76] Inventor: Raymond F. Wilkins, 1009 Frutchey Hill Rd., Easton, Pa. 18042

[21] Appl. No.: 470,158

[22] Filed: Jan. 25, 1990

[51] Int. Cl.⁵ .............................................. A46B 9/02
[52] U.S. Cl. .................................... 15/160; 15/172; 15/256.6; 474/92
[58] Field of Search ............. 15/106, 160, 172, 167.2, 15/256.5, 256.6, 104.04, 105, 210 R; 474/92

[56] References Cited

U.S. PATENT DOCUMENTS

| | | | |
|---|---|---|---|
| 328,426 | 10/1885 | Nowlin | 15/106 |
| 574,621 | 1/1897 | McCulloch et al. | |
| 575,520 | 1/1897 | Grupelli | |
| 577,508 | 2/1897 | Ash | 15/256.6 |
| 602,000 | 4/1898 | Fay | |
| 602,193 | 4/1898 | Neuert | 15/160 |
| 604,429 | 5/1898 | Sise | |
| 616,593 | 12/1898 | Stansbury | 15/160 |
| 628,087 | 7/1899 | Gibford | |
| 635,778 | 10/1899 | Hudelson | |
| 648,724 | 5/1900 | Cole | |
| 1,219,051 | 3/1917 | Tallaksen | |
| 1,616,484 | 2/1927 | Beynon | 15/167.2 |
| 1,668,385 | 5/1928 | Szekely et al. | 15/167.2 |
| 1,748,900 | 2/1930 | Pilla | |
| 1,860,306 | 5/1932 | Biener | |
| 1,950,959 | 3/1933 | Winsette | |
| 1,962,404 | 6/1934 | Nichols et al. | |
| 2,222,191 | 11/1940 | Zisman | |
| 2,571,320 | 10/1951 | Waters, Sr. | |
| 2,604,650 | 7/1952 | Mottelson | |
| 2,706,503 | 4/1955 | Zook | |
| 2,893,516 | 7/1959 | Bocchino | |
| 2,974,338 | 3/1961 | Roth et al. | 15/160 |
| 2,979,753 | 4/1961 | Gunston | |
| 3,736,616 | 6/1973 | Seip | 15/210 R |
| 4,223,417 | 9/1980 | Solow | 15/167.2 |
| 4,543,683 | 10/1985 | Goldman | |
| 4,570,285 | 2/1986 | Skelton | |
| 4,578,120 | 3/1986 | Chiarella | |
| 4,593,923 | 6/1986 | Thalmann | |
| 4,827,555 | 5/1989 | Fruit et al. | |

FOREIGN PATENT DOCUMENTS

| | | | |
|---|---|---|---|
| 59078 | 4/1891 | Fed. Rep. of Germany | 474/92 |
| 78410 | 11/1894 | Fed. Rep. of Germany | 15/167.2 |
| 88250 | 10/1896 | Fed. Rep. of Germany | 15/160 |
| 62053 | 11/1913 | Fed. Rep. of Germany | 15/256.6 |
| 55608 | 5/1952 | France | 15/172 |
| 16946 | of 1895 | United Kingdom | 474/92 |
| 21853 | of 1897 | United Kingdom | 474/92 |
| 24334 | of 1897 | United Kingdom | 474/92 |

Primary Examiner—Harvey C. Hornsby
Assistant Examiner—Mark Spisich
Attorney, Agent, or Firm—O'Keefe & Wilkinson

[57] ABSTRACT

An adjustable brush for cleaning sprocket chains, particularly on motorcycles, has a three-sided adjustable rectangular cleaning channel, one wall of which is adjustable manually during use inwardly and outwardly to change the width of the cleaning channel while maintaining the rectangular configuration of said channel. The brush allows effective cleaning on three sides of a sprocket chain simultaneously. Various improvements are possible including the use of rollers to facilitate smooth movement of the brush surfaces over the sprocket chain, the use of a transversely movable or adjustable intermediate brush at the head of the cleaning channel and the use of a closed four-sided cleaning channel.

19 Claims, 4 Drawing Sheets

BRUSH CLEANER FOR SPROCKET CHAINS

BACKGROUND OF THE INVENTION (1) Field of the Invention

This invention relates to drive chain cleaning and maintenance and more particularly to a brush-type tool for cleaning drive or sprocket chains, particularly for motorcycles and all terrain vehicles, but also for farm equipment, bicycles and the like, prior to oiling or relubrication of such chains. More particularly, this invention relates to a brush-type cleaning tool which provides for simultaneously cleaning at least three sides of a sprocket or drive chain at the same time by wire bristles mounted in the sides of a toolhead arranged for at least partial adjustable envelopment of the chain.

(2) Description of the Prior Art

The drive or sprocket chains used to transfer power from a motorcycle engine to the drive wheel is generally at least partially open to the surrounding environment and as a result quickly becomes dirty. Hard grit and the like collects upon the chain itself and in the lubrication oil with which such chains are coated. Such grit and dirt, in effect, serves as a wear or grinding medium acting upon the chain during use with detrimental results to the chain.

Ideally, a motorcycle drive chain should be relubricated after (or before) every significant use if undesirable wear of such chain and its interconnections with the operating mechanism of the motorcycle is to be avoided. Prior to lubrication, the chain should be thoroughly cleaned to remove dirt, grit and grime which may have collected upon and adhered to the chain as well as become mixed with the prior lubrication. If such prior collected dirt, grit and grime is not removed from the chain, relubrication of the chain merely mixes what are, in effect, ready-made grinding materials with the new lubricant resulting in detrimental wear and possible failure of the chain at an inopportune time. Wear of the chain also decreases the precision of its meshing with the drive mechanism so that a less precise drive may be obtained.

It has generally been the custom for either the owner of a motorcycle or the maintenance personnel in motorcycle shops to use an ordinary wire brush upon a motorcycle's sprocket chain. The wire brush is vigorously applied in sequence to all sides of the chain brushing away both the dirt, grit and grime which has accumulated during use, particularly under dusty or wet road conditions, and incidentally, also removing the principal portion of the prior lubrication. After removal of the main portion of the grit and grime plus the prior deteriorated lubrication, the chain may be either immediately relubricated with fresh lubricant such as oil or grease, or may be passed through a solvent solution to dissolve additional old lubricant from the chain surface after which the chain may be relubricated. The chain may also be dipped or otherwise cleaned initially with solvent and then preferably wire brushed, but this is both messy and expensive because of the contamination of large amounts of solvent with large quantities of contaminated lubricant. In addition, the solvent may attack and dissipate lubricating grease incorporated inside the drive chain rollers by the chain manufacturer. This is especially true in the case of sprocket chains which have rubber sealing rings at the ends of the chain rollers to ensure the retention of lubricant in the rollers. In such cases, the use of solvent may not only remove the supposedly permanently encapsulated lubricant, but may also quickly deteriorate the rubber or other polymer sealing rings. Even so, there is a tendency among maintenance people to try to save time by using nothing but solvent to clean sprocket chains prior to relubrication, with resultant long term damage to the chain.

Manually brushing away accumulated dirt, grit and grim from the surface of a chain by the usual wire brush method, however, is both tedious and frequently less than completely effective. In fact, the manual brushing of the chain with an ordinary wire brush considerably adds to the expense of operation and maintenance of a motorcycle or similar vehicle.

Mechanical cleaning means have been suggested for the cleaning, for example, of bicycle sprocket chains. Two examples of such cleaning devices are disclosed in U.S. Pat. No. 4,578,120 issued Mar. 25, 1986 to Michael A. Chiarella and U.S. Pat. No. 4,593,923 issued June 10, 1986 to Robert Thalmann. In both of these devices, brush-type cleaners are mounted within a cover upon a bicycle in a position so that the operating bicycle chain passes over such brush cleaners and intermediately through a lubricating medium during operation of the bicycle. While the Chiarella and Thalman devices are useful in extending the life of a bicycle chain, such devices have the drawback of not thoroughly cleaning the chain and also of, in effect, mixing dirt and grime into the lubricant reservoir resulting in undesirable contamination of the lubricant. In addition, since these devices operate continuously when the bike is being used, they are themselves subject to serious wear to such an extent as to be largely impractical from an economic viewpoint.

More recently, there have been lubricating brushes available for attachment to lubricant containers for both spreading lubricant and incidentally, cleaning the drive chain. These devices have not been particularly effective because they have had insufficient strength and durability to strip resistant dirt, grease and grime from the chains and simultaneous relubrication merely mixes the new lubrication with the old contaminates.

OBJECTS OF THE INVENTION

There has been a need, therefore, for a convenient tool for the cleaning of motorcycle and all terrain vehicle drive chains, in particular, and similar sprocket-type chains in general, for example, for bicycle chains, chain drive-type farm implements and the like. More especially there has been a very important need for a cleaning device for the cleaning of motorcycle drive chains which, because of the long distances which motorcycles may travel in a short time, become very quickly extremely polluted with road grit and the like which is very detrimental to the operation and life of a drive chain.

It is an object of the invention, therefore, to provide a brush-type tool designed especially for the effective and efficient cleaning of motorcycle drive chains.

It is a further object of the invention to provide a brush-type tool which will clean multiple sides of a drive chain at the same time.

It is a further object of the invention to provide a brush-type drive chain cleaning tool which may be adjusted to adapt it to cleaning different sized chains.

It is a still further object of the invention to provide a brush-type drive sprocket chain cleaning tool in which replacement brushheads may be simply and effectively mounted.

It is a still further object of the invention to provide a brush-type sprocket chain cleaning tool which is not only adjustable, but strong and durable so that significant cleaning and scouring force may be applied to the chain during cleaning to strip away resistant dirt and grime.

It is a still further object of the invention to provide a brush-type drive sprocket chain cleaning tool having rotatable chain support members for aiding in guiding the chain through the cleaning toolhead.

It is a still further object of the invention to provide a brush-type drive chain cleaning tool in which the head can be substantially completely closed so that the chain may be passed through the head with a minimum of resistance.

It is a still further object of the invention to provide means for guiding a chain through the head of a brush-type cleaning tool.

It is a still further object of the invention to provide a brush-type cleaning tool in which the head of the tool may be guided over the chain upon anti-friction means which aids in maintaining alignment of the toolhead with the chain.

It is a still further object of the invention to provide a convenient, economical tool for preliminarily cleaning a drive sprocket chain for a motorcycle or the like.

It is a still further object of the invention to provide a brush-type cleaning tool which, due to its efficiency and convenience in use, will eliminate the need or temptation to use solvent in cleaning sprocket chains which should not be exposed to solvent.

It is a still further object of the present invention to provide a convenient, relatively simple tool for the cleaning of drive sprocket chains for motorcycles and the like which can be used effectively by the usual motorcycle maintenance mechanic or owner to substantially increase the efficiency and speed by which a motorcycle chain may be cleaned.

It is a still further object of the invention to provide a tool for cleaning and maintaining sprocket drive chains and the like which will brush the sides of the chain links as well as the chain rollers simultaneously.

Other objects and advantages of the invention will become apparent from the appended drawings and accompanying description.

BRIEF DESCRIPTION OF THE INVENTION

The difficulties heretofore encountered in the manual cleaning of motorcycle drive sprocket chains and the like have been considerably alleviated and prior difficulties with wire brush cleaning obviated by the present invention of a tool having a transversely extended head with an opening or passageway in said head enclosed on a least three sides, upon which sides are mounted wire brushheads. A contaminated drive sprocket chain may be passed through the chain passage in the toolhead where it is contacted by the brushing means on at least three sides so that vigorous application of a side-to-side movement will result in brushing or removing grit, grime and dirt from the surface of the chain both from the sides of the chain and from the chain rollers simultaneously. The transverse dimensions of the passage in the toolhead may be varied by moving the opposed sides of the head toward or away from each other by suitable unique adjustment means. Otherwise it would be impossible to clean all three sides of the chain simultaneously.

In a prefered version of the tool, a rotatable antifriction means is provided on one side of the head for support against the chain as it passes through the head to facilitate efficient operation. Preferably, the two sides of the head are independently adjustable with respect to the antifriction means in order to maintain proper alignment of the antifriction means with the chain during use. In a variation of the invention, the toolhead may be arranged with a fourth side which may, for example, pivot into position effectively closing the head and producing a tunnel arrangement having wire bristles or the like on four sides which may then operate on four sides of the sprocket chain at one time.

BRIEF DESCRIPTION OF THE DRAWINGS

FIG. 3 is a top view of the brush-type tool shown in FIGS. 1 and 2.

FIG. 3b is a side view of the removable wire brush section shown in FIG. 3a.

FIG. 5a is a bottom view of the embodiment of the brush tool shown in FIG. 5 showing the two sprocket chain guide rolls.

FIG. 5b is a top view of the embodiment of the invention shown in FIGS. 5 and 5a.

FIG. 5c is an enlarged cross-section through one of the antifriction rollers in FIGS. 5a and 5b.

FIG. 8 is a side elevation of an embodiment of the invention similar to that shown in FIGS. 1 to 3 but including an additional pivoted side jaw for forming a closed passage for a drive sprocket chain to pass through during cleaning.

FIG. 9 is a view of the operative side of a jaw replaceable brush section for mounting in the sides of the brush tool jaws.

FIG. 10 is a view of the operative side of a replaceable brush section for use in the top or intermediate jaw of the tool of the invention.

BRIEF DESCRIPTION OF THE PREFERRED EMBODIMENTS

Drive sprocket chains for motorcycles and other indirect drive equipment and vehicles such as, for example, all terrain vehicles and some field-type farm equipment require frequent lubrication to prevent accelerated deterioration and ultimate failure. Prior to lubrication, such chains should be thoroughly cleaned of dirt, grit and grime adhering to the surface so that the addition of new lubricant does not merely form a suspension of what are, in effect, grinding compounds that would otherwise adversely wear the chain and its associated sprockets and other mechanism. In the past, cleaning of the chain surface has usually been accomplished either by use of a solvent which can harm the internal lubricant in many chain rollers or by judicious use of a wire brush on the chain to remove the majority of the grit and grime prior to application of new lubricant. Such cleaning of the drive sprocket chain is both tedious and time consuming and there has been a need for a tool designed to accomplish such cleaning in an expeditious and efficient manner. The present inventor has discovered that such cleaning can be expedited and made more efficient by the use of an adjustable brushing tool having a plurality of brushing surfaces designed for closely encompassing at least several sides of the drive chain to be cleaned. Such improved tool is illustrated in the accompanying drawings and described in the appended description of such drawings as follows.

Figures 1, 3A:
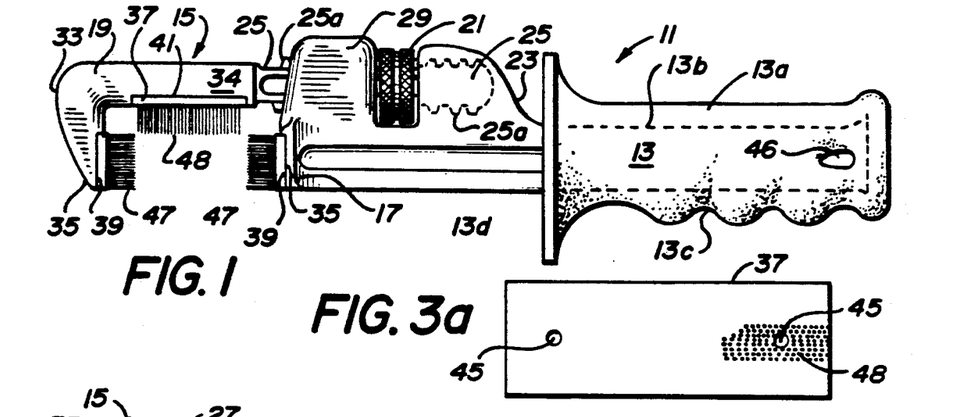
FIG. 1 is a side elevation of the brush-type tool of the invention.
FIG. 3a is a top view of a removable wire brush section for use in the embodiment of the brush-type tool shown in FIGS. 1 to 3.

In FIG. 1 there is shown a tool 11 having a handle 13 comprising, as shown, an external elastomeric or plastic handle 13a molded for secure gripping upon a metal structural core 13b, which at its working end merges into a laterally or transversely expanded cleaning head 15 (see in particular FIGS. 2 and 3) which as shown, is formed of two parts or jaws. The first part or jaw 17, is a downwardly extending integral portion of the handle core section 13b, shown in phantom, of the cleaning tool. The second part or jaw 19 of the expanded head of the cleaning tool is longitudinally movable or adjustable with respect to the handle section 13 by means of a knurled round adjustment nut or roller 21 which may be turned by finger or thumb pressure and upon rotation, longitudinally adjusts the movable jaw section 19 through interaction with spiral threads on an extension 25 of the movable jaw section 19. The extension 25 is integrally attached to the principal expanded portion 27 of the movable jaw section 19 and extends through an opening in a guide portion 29 of the handle 13 of the cleaning tool. The extension 25 also extends for a short distance, as shown in phantom, into an orifice, not shown, in an enlarged portion 23 of the core 13b of the handle portion 13 of the tool on the opposite side of the knurled adjustment nut 21. The sides of wires 47 in replaceable brush sections 35 as well as wires 48 in a replaceable brush section 37 can be seen in FIGS. 1 and 2.

The molded plastic or elastomeric rubber or the like external portion 13a of the handle 13 has molded finger grips 13c as well as a flange or guard 13d at the inner end of the handle section to partially shield the hand of the user from the operating portions of the brushing tool or the chain which passes through the brushing tool.

The movable jaw section 19 is comprised of three major structural sections, namely, the main longitudinal portion 31 of the jaw, a dependent portion 33 of the jaw which essentially opposes the jaw 17 integral with the handle and the extension 25 of the movable jaw section 19. Between them, the three jaw sections define a central chain cleaning channel 16. The extension 25 is provided with discontinuous threads 25a. The dependent jaw portion 33 and the main longitudinal portion 31, which forms a transverse or intermediate jaw 34, together form the principal expanded portion of the movable jaw section 19. Each jaw portion 17, 33 and 34 is also supplied with a replaceable wire brush insert 35 or 37 which form the sides of the chain cleaning channel 16. These inserts 35 and 37 are adapted to fit in machined openings or beds 39 and 41 cut into the face of the respective jaws 33 and 17 and 34. Identical inserts 35 fit on the jaws 17 and 33 and wire brush insert 37 fits on jaw 34. The replaceable brush sections may be secured in the beds or openings in the jaws 39 and 41 in any suitable manner, one of which is by the provision of screw openings in the brush sections through which suitable fastenings, such as, for example, threaded machine screw-type fastenings may be threaded or otherwise secured to the jaw members. The heads of such screw-type fastenings 43 may be seen in openings 45 in the face of the replaceable brush section 37 in the longitudinal portion 31 of the movable jaw 19 as shown best in FIG. 2. The lower or brush portion of the replaceable brush section 37 is shown by itself in FIG. 3a and the screw fastening openings 45 can be seen in such section. The ends of the wires 48 on the replaceable insert 37 can also be seen in FIG. 3a as well as in FIG. 2 and the side of the wires 48 in the replaceable brush section 37 can be seen in FIG. 3b and also in FIG. 1.

It will be noted, particularly in FIG. 1, that the replaceable brush sections 35 are opposed to each other and move either towards or away from each other when the movable jaw section 19 is moved by rotation of the knurled adjustment nut 21. It will also be noted that the replaceable brush sections 35 are positioned or mounted upon the jaws 17 and 33 and are positioned such that their wire bristles or wires 47 are positioned below the ends of the wires 48 of the replaceable brush section 37 mounted upon the jaw 34 on the longitudinal portion 31 of the movable jaw section 19. Consequently, as the wire bristles 47 approach each other as the jaws 33 and 17 approach upon adjustment of the knurled rotatable nut 21, the wires 47 of the replaceable brush sections 35 will clear the ends of the wires 48 of the replaceable brush section 37. An opening or eye 46 is provided in the end of the handle 13 of the brushing tool for retention of a cord or the like for hanging up the brush or for aiding in holding or retaining it in the hand of the user.

Figure 2:
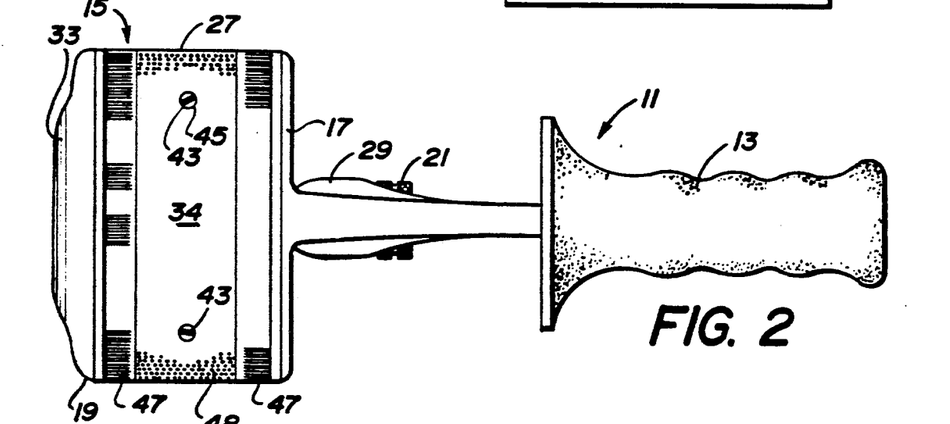
FIG. 2 is a bottom view of the tool shown in FIG. 1.
Figures 3, 3B:
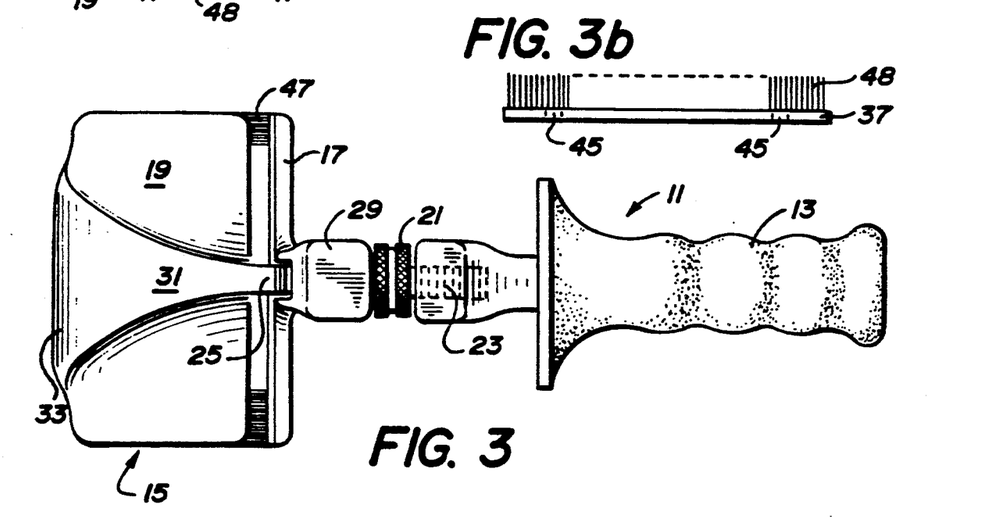

During use of the sprocket brushing tool shown in FIGS. 1 to 3, it will be understood the knurled roller or nut 21 will be adjusted until the opening between the ends of the wires 47 of the replaceable brush sections 35 is approximately the same distance as the width of the sprocket chain to be cleaned. The brush tool may then be placed over the chain with the jaws 33 and 17 straddling the sides of the chain and at this point, the chain can either be drawn through the jaws of the brushing tool or the jaws of the brushing tool can be moved vigorously along the chain, brushing any dirt and grime from the chain. It will usually be found more convenient when the chain is still mounted upon a cycle or other vehicle to pull the chain through the brush tool while holding the tool stationary. The chain may be moved usually by rotating the wheel of the vehicle manually or by gripping and pulling the chain. The molded handle aids in this operation by allowing an effective grip upon the tool and also in protecting the hand of the user.

It will be recognized that the adjustment of the head of the tool so that the wire bristles 47 of the replaceable brush sections 35 in the jaws 17 and 33 contact the sides of the chain as the tool and chain are moved relatively to each other, saves significant time in cleaning the chain, since two sides of the chain can be cleaned at one time. In addition, if the sprocket chain, and particularly the chain rollers, are held against the third side of the jaw, i.e. against the wire bristles 48 of the replaceable brush section 37 in the intermediate jaw 34, the third side of the chain can also be cleaned at the same time. When such roller chain side is adequately brushed and cleaned, the chain can then, if needed, be turned over and the opposite side cleaned by contact with the bristles 48 at the same time as the two sides of the chain are further cleaned by additional contact with the wire bristles 47 of the replaceable brushes 35. Actually, since the chain rollers are usually rotatable, the chain may frequently be rather thoroughly cleaned without turning over or reversing the chain, but for a thorough job it is preferred to clean or brush the chain from both sides. Since the distance of the jaws 17 and 33 can be easily adjusted while working with the tool by rotation with the thumb, the chain can be repeatedly turned ninety (90) or more usually, one hundred and eighty (180) degrees within the jaws of the brushing tool and thoroughly cleaned consecutively on various sides by various of the brushing surfaces. Alternatively and more conveniently, the brushing tool may be turned 180 degrees with respect to the chain. The sturdy construction of the tool and adjusting mechanism ensures that considerable force can be brought against the side of the chain by the device to facilitate a thorough cleaning.

The brushing with the tool of the invention may be followed by relubrication of the sprocket chain in any desirable manner or may, in those chains having no permanent or effectively permanent lubricant, be followed by placement of the sprocket chain in a cleaning or dissolving solution for further removal of old lubricant. It is also possible to alternate brushing and solution treatment steps in a series. However, as indicated, many sprocket chains will be harmed by the use of a solvent and the tool of the invention is particularly useful in such cases. It will be understood that either the brush or the chain may be held in a vice or other jig-type holder while the chain is being passed relatively through the jaws of the brushing device of the invention.

When the wire bristles of the replaceable brush sections 35 and/or 37 become undesirably worn, they can be readily replaced by removing the fastenings such as screw fastenings 43 from the fastening openings 45 whereupon new, replaceable brush sections can be secured in their place.

In the arrangement shown in FIGS. 1 through 3, it will be recognized that it may be difficult to center the upper replaceable brush 37 upon the sprocket chain being cleaned, since the location of the central brush 37 with respect to the brush 35 on the jaw 17 will depend upon the width of the chain. This is not an insurmountable problem in the embodiment shown in FIGS. 1 through 3, but assumes more importance in FIGS. 5, 5a and 5b to be described which the brush 37 with wire bristles 48 may be centered with respect to the opening between the two side jaws of the brush tool.

Figure 4:
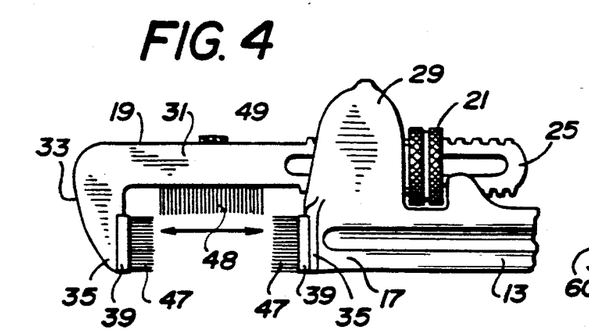
FIG. 4 is a side elevation of an alternative embodiment of the brush tool of the invention including an adjustment means mounted in the tool head for facilitating adjustment of the central brush to accommodate the opening between the jaws necessary for different size sprocket chains.
Figure 4A:
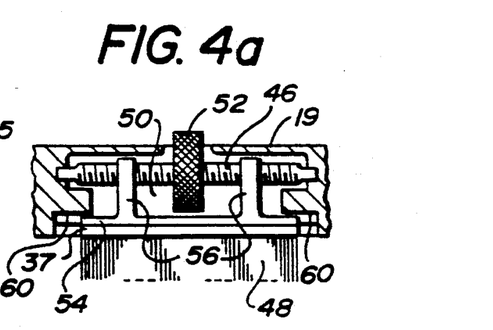
FIG. 4a is an enlarged cut-away view of the adjustable mounting of the central brush of the embodiment shown in FIG. 4.

FIGS. 4 and 4a show an improved embodiment of the basic invention shown in FIGS. 1 through 3 in which the brush 37 is journaled on a screwthreaded rod 46 journaled in turn as shown at the ends in the walls of a chamber or opening 50 in the longitudinal jaw member 31. The screwthreaded rod 46 may be rotated by means of a knurled adjustment roll or wheel 52. The brush 37 may, in this manner, be moved laterally toward or away from the brushes 35 on either side to center the brush 37 with respect to the opening between the two brushes 35. Since the wires 48 of the brush 37 pass over the top of the wires or bristles 47 of the brushes 35, the adjustment of the brush 37 provided for in the arrangement of the invention shown in FIGS. 4 and 4a may be used to vary the position of the brush so that wear on the bristle wires 48 may be distributed over the surface of the brush. The width of the brush 37 and its position on the main longitudinal jaw portion 31 may be varied in order to provide for effective brushing and cleaning of various widths and sizes of sprocket chains. As may be seen in FIG. 4a, the top of the brush 37 is attached directly to a movable base plate 54 by any suitable fastenings, not shown. The base plate 54 is carried by two columns 56 which are threaded directly upon the threaded rod 46. The base plate 54 with the attached top of the brush 37 slides in the machined bed 60 in the main longitudinal jaw portion 31. It will be recognized that the arrangement shown is sturdy and durable and provides a backing for the brush which allows significant pressure to be applied to the brush for effective wiping and cleaning of a sprocket chain. As noted above, the adjustability of the central brush 37 assumes particular importance in the embodiment shown in FIGS. 5, 5a and 5b, next described.

Figure 5:
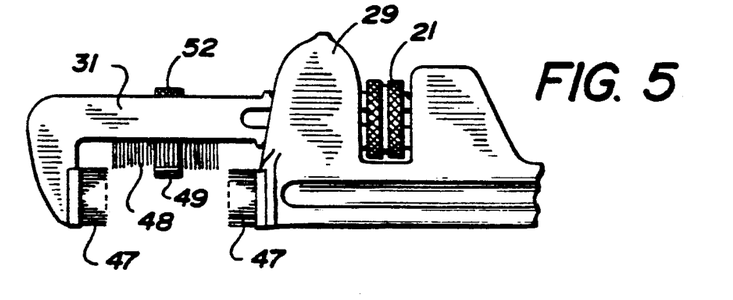
FIG. 5 is a side view of the embodiment of the invention shown in FIG. 4 with the addition of a pair of sprocket chain guide rolls arranged in the central head portion of the brush tool.
Figures 5A, 5B, 5C, 8, 9, 10:
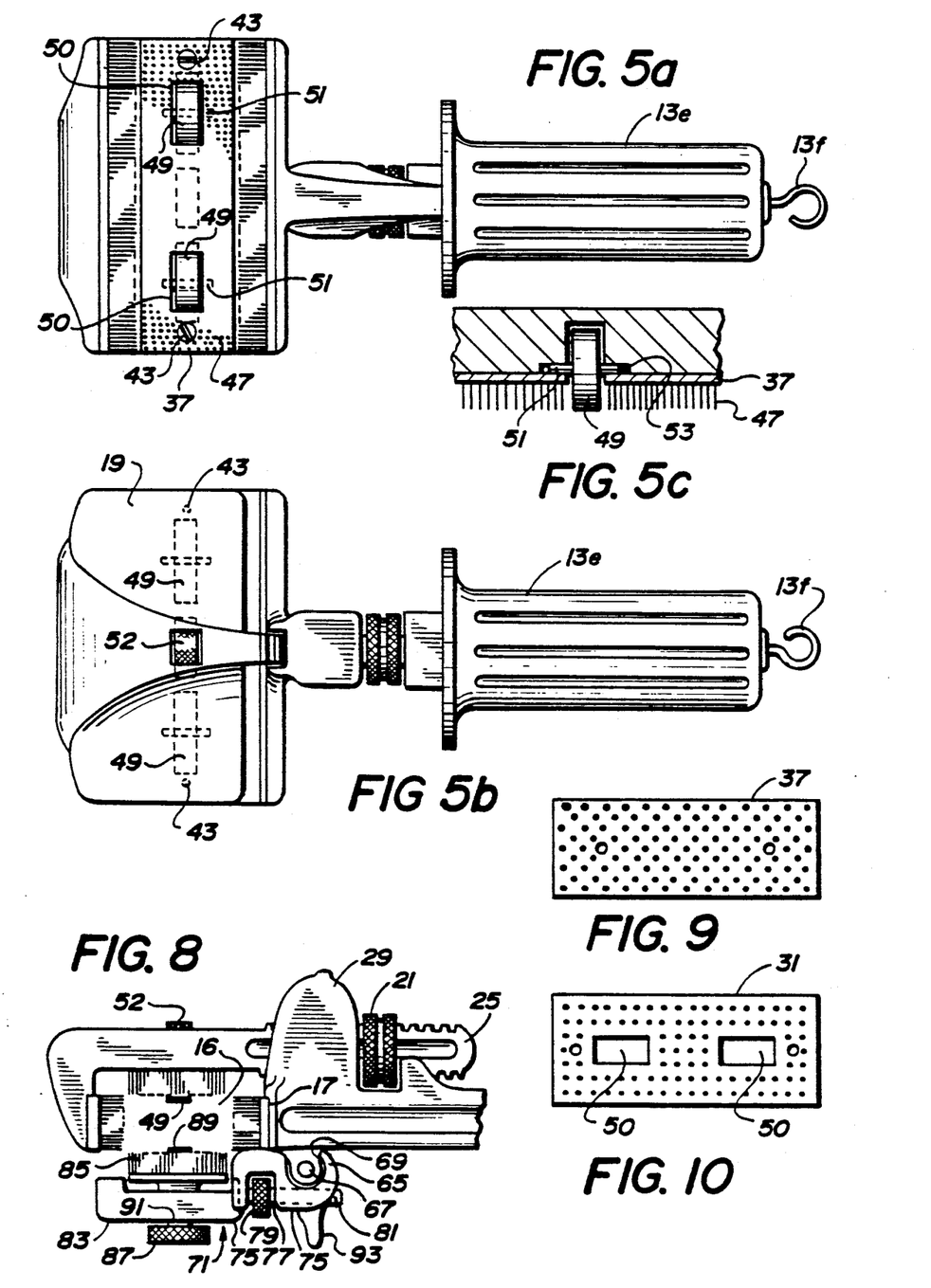

FIGS. 5, 5a and 5b show an improved embodiment of the basic invention shown in FIGS. 1 to 3, particularly as improved in FIGS. 4 and 4a. As shown in FIGS. 5, 5a and 5b, one or more guide rollers 49 are journaled in the surface of the jaw 34 of the longitudinal portion 31 of the movable jaw section 19 of the brush tool of the invention. FIG. 5a shows the bottom of the brushing tool of the invention shown in FIG. 5 illustrating more particularly the placement of two rotatably journaled antifriction guide rollers 49 in the bottom of the brushing surface or jaw 34 of the longitudinal portion 31 of the movable jaw section 19. FIG. 5b shows the top of the brushing tool shown in FIGS. 5 and 5a. The remainder of the brushing tool shown in FIGS. 5, 5a and 5b is the same as that shown in FIGS. 1 to 4a and the same reference numerals are therefore used to refer to like or similar parts. When the embodiment of the brushing tool shown in FIG. 5 is used, the sprocket chain is drawn across the surface of the antifriction rollers 49 so that the chain is, in effect, supported upon such rollers. The provision of the rollers allows considerable pressure to be placed upon the chain in the direction of the tool or upon the tool in the direction of the chain, if the chain is mounted in a holder, without unduly wearing the wire bristles of the replaceable brush section 37. This allows the tool to be more easily used by less skilled operators without damage to the chain or excessive wear of the wire bristles of the cleaning tool. It will be noted that the two antifriction rollers 49 are mounted in line with each other and are completely surrounded by the wire bristles 48 which extend either to or just beyond the top surfaces of the rollers. The bristles 48 are shown just above the surface of the friction rollers in FIG. 5, however, in order to more clearly show such rollers. The view shown in FIG. 5 is thus somewhat distorted. As will be noted in FIG. 10, to be described hereafter, the replaceable brush section in this embodiment has openings 50 to accommodate the antifriction rollers 49 and such roller may be journaled on short shafts 51 mounted in grooves 53 in the central or main longitudinal jaw portion as shown more particularly in the enlarged cut-away view in FIG. 5c which is a cross section through one of the antifriction rollers parallel to the short supporting shafts 51. It will be seen in FIG. 5c that the replaceable brush sections 37, when mounted on the surface of the jaw 34 by the screw fastenings 43, see FIG. 5a, serve secondarily to hold the shafts 51 in the grooves 53 when the brush sections are mounted in the machined bed 41 in the central jaw. It will be understood that this provision for mounting and retaining the antifriction rollers in place and rotatable is simple and economical. However, other arrangements could also be used. For example, if desired, simple antifriction bearing means could be mounted in the grooves 53 or in suitable openings in the face of the jaw to journal the rollers 49. Such antifriction bearing means could also be held in place in various other manners, none of which constitutes a part of the present invention.

The embodiment of the brush tool shown in FIGS. 5a and 5b also has a plastic or elastomeric external handle portion 13e molded in the form of a more or less standard motorcycle steering grip. This is effective in providing a secure grip and has the added advantage of providing a handle the feel of which is familiar to motorcyclists. This grip, therefore, is particularly suitable where the user of the brush tool of the invention is the motorcyclist himself or herself. See in particular FIGS. 5a and 5b. An eyelet-type hook 13f is provided at the outer end of the handle 13e to serve the same purpose as the opening 46 in FIG. 1.

Figure 6:
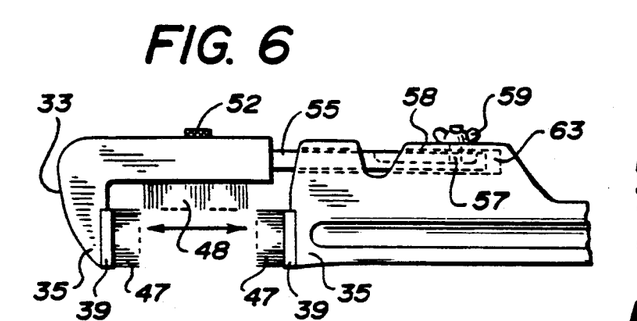
FIG. 6 is a side elevation of an alternative embodiment of the invention incorporating a different securing mechanism for positioning and securing the tool jaws during use of the tool.
Figure 6A:
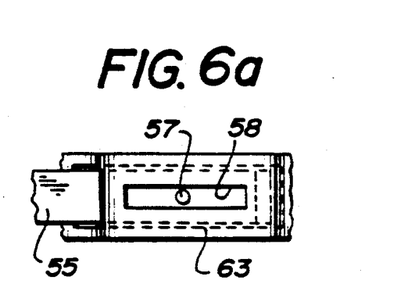
FIG. 6a is an enlarged top cut-away view of the sliding extension arrangement of the embodiment shown in FIG. 6.

FIG. 6 shows a still further embodiment of the tool of the invention in which a variation of the adjustment for the movable jaw section 19 is shown. In FIG. 6, the extension 25 of the movable jaw section 19 is made wider and flatter, as shown in partial cut-away view in FIG. 6 and also in FIG. 6a. This laterally extended extension is generally designated 55. The outer end of the extension 55 is provided with a slot 58 which passes over a threaded stud 57 which may be provided with a wing nut-type threaded adjustment fitting 59. FIG. 6a is a partially cut-away top view of the extension 55 showing a slot 58 in which the threaded stud 57 is adjustably accommodated. As may be seen in FIG. 6, when the wing nut-type adjustment fitting 59 is screwed onto the stud 57, it may, with sufficient turning or rotation, be brought down tight against the top of the laterally expanded jaw section extension 55 contacting the extension and serving to jam adjust the extension 55 against the bottom of the opening 63 in which the extension is positioned. It will be seen, therefore, that the arrangements shown in FIGS. 6 and 6a provide an alternative method for securing the movable jaw 19 in position with respect to the handle 13. The remainder of the brushing tool shown in FIG. 6 is essentially the same as in FIGS. 1 to 3 and the same reference numerals are used in all such figures to refer to the same or substantially similar parts. It will be understood that the upper portion of the tool will be laterally extended to accommodate the widening of the extension 55.

Figures 7, 7A:
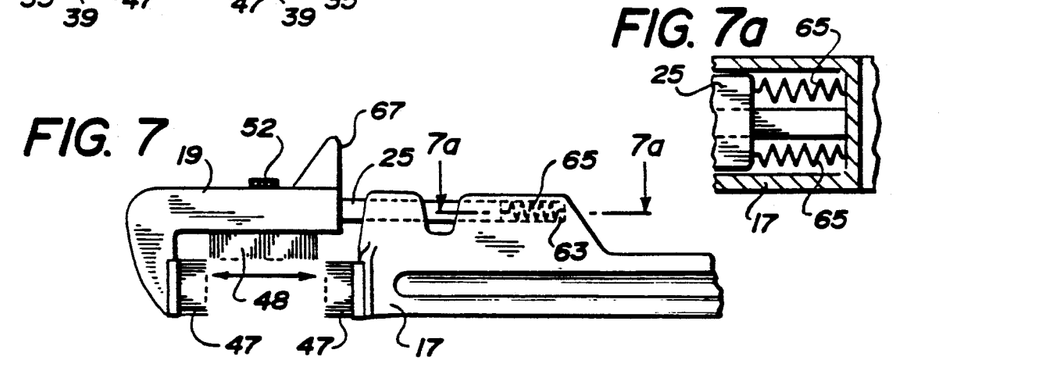
FIG. 7 is a side elevation of a still further embodiment of the invention in which the jaws are continuously adjustable during use by a retracting spring mechanism.
FIG. 7a is a partial cut-away view of the embodiment shown in FIG. 7 showing the retracting spring mechanism.

FIG. 7 shows a still further embodiment of the invention in which the movable jaw section 19 and particularly the working dependent portion or jaw 33 of the movable jaw section 19, is biased with a more or less uniform force towards the dependent integral jaw section 17 at all times by means of a pair of spiral tension springs 65 which are secured to the end of the opening 63 in the handle 13 of the tool at one end and to the end of the extension 25 of the jaw section 25 at the other end. It will be understood that the upper portion of the tool will be expanded transversely as in FIG. 6, in order to accommodate widened slide member 55 and the two spiral springs at the terminus thereof. A thumb butt or thumb contact surface 67 extends upwardly from the rear of the movable jaw section 19. The thumb butt 67 provides a contact surface for the thumb of the tool user to place pressure upon the movable jaw section 19 to bias it away from the handle 13 of the tool increasing or widening the distance between the jaws 33 and 17 of the tool for insertion of a sprocket chain between the jaws. After the sprocket chain is inserted between the jaws, the thumb biasing pressure is removed from the thumb latch 67 allowing the springs 65 to draw the movable jaw section toward the handle with the extension 55 of the jaw section sliding through the opening 63 in the handle. Such movement of the jaw section will continue until the wire bristles 47 of the replaceable brush sections 35 contact the sprocket chain on each side and then continues to place pressure upon the sprocket chain by the biasing force of the spiral spring 65. In this manner, the tool may be conveniently and quickly adjusted for the size of the sprocket chain and will thereafter maintain continuous pressure against the sides of the sprocket chain as the tool is moved over the chain or the chain is moved through the toolhead. When it is desired to remove the chain from the tool, the thumb of the user is placed again upon the thumb butt 67 to bias the movable jaw section 19 away from the handle section and the jaw 17 integral with the handle. As will be recognized, the construction provides a quick and convenient method for adjusting the tool to various sizes of sprocket chain and also provides a quick adjustment of the tool for placement of the chain between the jaws.

FIG. 8 shows a further embodiment of the invention in which a pivotally attached fourth jaw member closes the sprocket chain brushing and cleaning channel 16 in the cleaning tool head 15 so that the sprocket chain during cleaning is cleaned simultaneously on four sides. In FIG. 8 the fixed dependent jaw 17 of the brushing tool is provided at the rear bottom with a pivot axel 65 held in the twin arms 67 of a clevis arrangement 69 extending from the dependent jaw structure 17. A rotatable support member 71 is journaled on the axel 65. This rotatable support 71 has a generally curved surface configuration with a rectilinear enlargement 73 on one side. Such enlargement 73 is provided with two transverse wing extensions 75 with a groove 77 between them in which is mounted a knurled wheel 79 threadedly engaged with an extension 81 of a transversely extended pivote jaw member 83. The jaw member 83 is provided with an adjustable, replaceable brush section 85 vertically adjustable by means of a threaded arrangement controlled by knurled knob 87. A friction roller or support roller or rollers 89 similar to the rollers 49 may be provided in the replaceable brush section 85. A threaded screw adjustment rod 91 provided with a rotatable knob 87 extends through the bottom of the jaw member 83 into engagement with the sliding brush section 85 to which it is secured to move the brush section 85 in or out of the jaw section 83 and adjust the position of the brush to the size of the sprocket chain to be cleaned as well as prevent interference with the wire bristles of the replaceable brush sections 35.

A thumb butt or latch 93 is provided on the rotating support member 71 for manual pivoting of the member 71 and attached jaw member 83. The jaw member 83 may be further provided with means for transverse adjustment of the roller 89 to align the antifriction roller 89 with the center of a sprocket chain to be cleaned. Such an arrangement is not shown, however.

A latch or other securing means could be provided to maintain the pivoting jaw 83 in position during use. However, it will usually be found adequate for the user of the brush tool to bias the jaw into position by thumb pressure on the thumb latch or butt 93 during the cleaning of a chain. The use of manual biasing pressure during use of the tool provides more precise control of the tool and is frequently more expeditious because the pivoted jaw can be flipped into place and opened substantially instantaneously as necessary when the sprocket chain is removed, replaced or adjusted in the cleaning channel 16 of the tool 11.

FIG. 9 is a top view of one of the replaceable brush sections 35 showing a preferred uniform alignment of the wire bristles in the replaceable brush section. The diagonal arrangement of the bristles, as shown in FIG. 9, has been found to be particularly desirable in channeling dirt away from the sprocket chain during use.

FIG. 10 is a top or active face view of the replaceable brush section 37, as used in the various embodiments of the invention which include the antifriction roller means 49. The openings 50 for the antifriction rollers 49 are seen in FIG. 10. It will be noted in FIG. 10, that the replaceable brush section 37, rather than having the diagonal bristle arrangement of the brush section 35, has a substantially block or rectangular pattern in the replaceable brush section 37. This arrangement is preferable for the replaceable brush 37, since such brush is used on jaw 34 located on the longitudinal portion 31 of the movable jaw 19.

Figure 11:
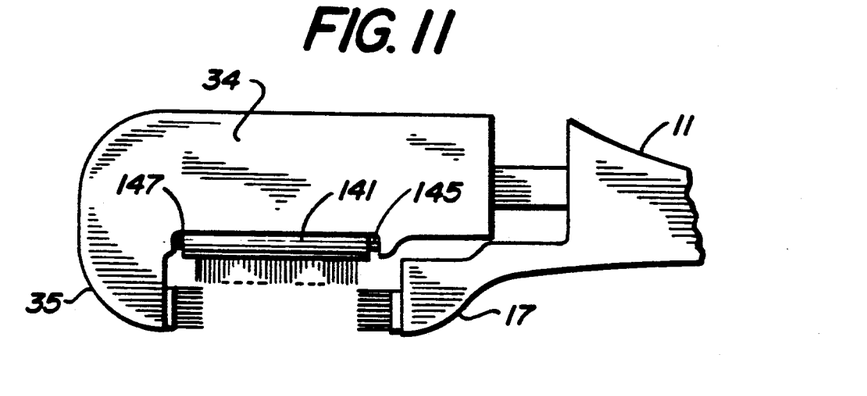
FIG. 11 is a side view of a further embodiment of the invention in which two elongated side rollers replace the two sprocket chain rollers shown, for example, in FIGS. 5, 5a and 5c.
Figure 12:
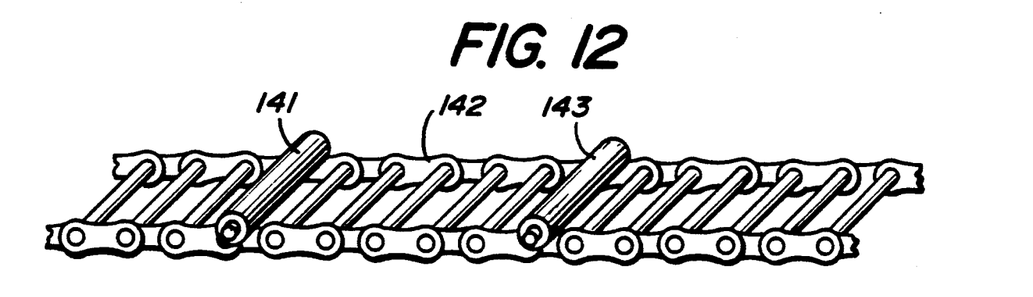
FIG. 12 is a perspective view of the elongated side rollers shown in FIG. 11 in contact with a fairly wide sprocket-type chain.
Figure 13:
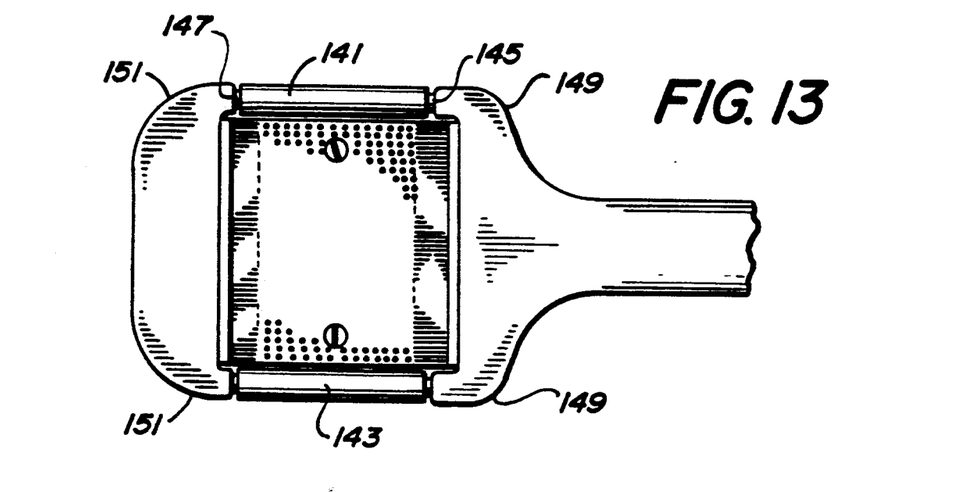
FIG. 13 is a bottom view of the embodiment of the invention shown in FIG. 11.

FIGS. 11, 12 and 13 show a further embodiment of the invention in which antifriction support rollers for support of the sprocket chain are, instead of being positioned within the confines of the brush 37, positioned outwardly of said brush at the edge of the head. These rollers 141 and 143 are elongated so as to extend across the entire width of the upper brush. Consequently, if the brush tool opening is adjusted so that the brushes contact a sprocket chain positioned between the jaws, the rollers 141 and 143 will be in position to support the chain. FIG. 12 is a partial view of the rollers positioned on a rather wide sprocket chain. Each roller 141 and 143 is journaled at the ends on pins 145 and 147 which pins extend from extensions 149 and 151 on the outer portions of the upper jaw 19 of the brush tool. This can be clearly seen in FIG. 13 which is a bottom view of the tool. The arrangement shown in FIGS. 11 and 13 is a preferred arrangement of the support rollers which is simple and effective. Such arrangement can be combined with any of the previously illustrated arrangements for adjustment of the jaws of the brush tool for close contact with the sides of the sprocket chain.

It will be recognized from the foregoing description, explanation and drawings that the present inventor has created a brushing tool which is particularly effective in cleaning sprocket chains for motorcycles and all terrain vehicles as well as other sprocket drive chains, for both vehicles and other equipment, which may become contaminated with dirt and grit and grime during use, prior to relubrication of such chains. The tool of the invention by its efficiency greatly decreases the time necessary for the usual cleaning of such chains and by its efficiency, facilitates and encourages both users and maintenance people to do a thorough job of cleaning the chain at the frequent intervals during which it should be cleaned and relubricated.

While it will be understood that the invention has been described in considerable detail in connection with the above drawings and explanations of the various embodiments illustrated, the invention is not to be limited to the particulars of any such embodiments, but is to be construed broadly with reference to the language of the appended claims so as to provide the broadest possible interpretation of such claims in view of the prior art and thereby to effectively encompass the intended scope of the invention.

I claim:

1. An adjustable brush-type cleaning tool for cleaning sprocket chains and the like comprising:
   (a) a elongated handle for manual support of the adjustable brush during use,
   (b) a laterally extended head rigidly attached to the handle, said head incorporating a first movable jaw and a second fixed jaw attached to said head and opposed to said movable jaw, said first movable jaw being movable directly toward and away from said second opposed jaw while rigidly maintaining the faces of said jaws substantially parallel to each other, and further wherein said first movable jaw is movable in a direction parallel to the longitudinal axis of the handle
   (c) means for mechanically biasing the first movable jaw toward the second fixed opposed jaw by manual manipulation,
   (d) a third intermediate jaw extending at a right angle to the first and second jaws and defining in cooperation with the first and second jaws, one surface of a rectangular three sided partially enclosed sprocket chain cleaning channel extending substantially transversely of the handle, and
   (e) means for accommodating bristle brush means on the said first movable jaw, second fixed jaw, and third intermediate jaw to form a rectangular brush lined channel having a wall movable toward an opposite wall.

2. A brush-type cleaning tool in accordance with claim 1 including additional means for facilitating movement of the cleaning tool smoothly over a sprocket chain additionally comprising:
   (f) antifriction roller means incorporated in the third intermediate jaw with rotation of said roller means substantially transverse of the handle of said brushing tool.

3. A brush-type cleaning tool in accordance with claim 2 wherein the third intermediate jaw is separately movable toward and away from the first movable jaw perpendicular to said first jaw.

4. A brush-type cleaning tool in accordance with claim 2 wherein the second movable jaw is mounted upon an elongated movable member which slides inwardly and outwardly substantially parallel with the handle in a close-fitting elongated slide opening in a portion of the laterally extended head providing thereby a substantial back-and-forth movement with little side play.

5. A brush-type cleaning tool in accordance with claim 4 wherein the antifriction roller means is journaled in a movable mounting movable along with the third intermediate jaw independently along the elongated arm upon which the first movable jaw means is mounted.

6. A brush-type cleaning tool in accordance with claim 4 wherein the means for biasing the first movable jaw comprises a threaded extension of such first movable jaw section engaging a rotatable wheel longitudinally fixed in a portion of the laterally extended head.

7. A brush-type cleaning tool in accordance with claim 4 wherein there are at least two antifriction roller means disposed transversely of each other and journaled in the third intermediate jaw.

8. A brush-type cleaning tool in accordance with claim 2 wherein the means for biasing the first movable jaw comprises a threaded extension of the movable jaw engageable with a rotatable locking nut positioned on said head such that said threaded extension is guided at right angles to the surfaces of the first movable and second fixed jaws.

9. A brush-type cleaning tool in accordance with claim 2 wherein the means for biasing the first movable jaw comprises spring means located in said head and which abuts an extension of the movable jaw section for continuously urging the movable jaw section toward the fixed jaw section such that said extension is movable at right angles to the surfaces of the first movable and second fixed jaws.

10. A brush-type cleaning tool in accordance with claim 1 wherein the means for biasing the first movable jaw comprises a threaded extension of the movable jaw threadedly engaging a rotatable wheel longitudinally fixed in a portion of the laterally extended head and including rigid guide means for guiding said threaded extension at right angles to the surfaces of the first and second bristle brush surfaces.

11. A brush-type cleaning tool in accordance with claim 1 wherein the means for biasing the first movable jaw comprises a threaded extension of the movable jaw engageable with a rotatable locking nut positioned on said head such that said threaded extension is guided at right angles to the surfaces of the first movable and second fixed jaws.

12. A brush-type cleaning tool in accordance with claim 1 wherein the means for biasing the first movable jaw comprises spring means located in said head and which abuts an extension of the movable jaw section for continuously urging the movable jaw section against the fixed jaw section such that said extension is movable at right angles to the surfaces of the first movable and second fixed jaws.

13. A brush-type cleaning tool in accordance with claim 1 wherein both the first movable jaw and the third intermediate jaw are movable with respect to the second opposed jaw upon an elongated arm sliding in the laterally extended head and the third intermediate jaw is movable separately along the elongated arm perpendicular to the first and second jaws.

14. A brush-type cleaning tool in accordance with claim 13 additionally comprising a fourth jaw pivotally mounted adjacent the second fixed jaw and adapted to be pivoted to a location parallel and directly opposite said third intermediate jaw.

15. A brush-type cleaning tool in accordance with claim 13 wherein the first movable jaw is movable with respect to the third intermediate jaw through a member on the third jaw threaded to receive a rotatable adjustment wheel longitudinally fixed in a portion of the mounting for the first movable jaw.

16. A stiff multiple brush-type hand tool for cleaning sprocket chains comprising:
(a) a rigid molded head having a restricted dimension elongated passage at least partially therethrough, said passage having rigid walls,
(b) a elongated handle for manual support and manipulation rigidly connected to the molded head,
(c) a first jaw means fixedly mounted upon the molded head having a face positioned substantially opposite to the handle,
(d) an elongated rigid member dimensioned to slidingly fit into the restricted dimension elongated passage in the rigid head so as to be movable parallel to the axis of the handle,
(e) a second movable jaw means extending transversely from a portion of the elongated rigid member opposite the portion slidingly engageable with the passage and said jaw having a face substantially parallel and opposed to the face of the jaw fixedly mounted upon the molded head,
(f) a third jaw means mounted upon the elongated member slidingly positioned in the elongated passage, the face of said third jaw means being substantially perpendicular to and positioned to one side of the first and second jaw means such that the faces of the three jaw means form a substantially rectangular three-sided channel, and
(g) attachment means for mounting stiff bristle-type brushes on the first, second and third jaw means with the bristles of the brushes on the first and second jaw means being opposed to each other and the bristles of the brush on the third jaw means being positioned transverse thereto.

17. A multiple brush-type hand tool in accordance with claim 16 wherein the bristles of the third brush are positioned just beyond and to the side of the bristles of at least the first brush to allow movement of said third brush at least partially to the side of the first brush.

18. A multiple brush-type hand tool in accordance with claim 17 wherein the bristles of the third brush are positioned also to the side of the second brush and the third jaw is movably mounted for movement in line with the elongated member to provide adjustment of the third brush position.

19. A multiple brush-type hand tool in accordance with claim 17 additionally comprising:
(h) rollers mounted with their surfaces slightly below the surfaces of the third brush in a position to facilitate movement of the brush surface smoothly across a sprocket chain during lengthwise movement respective to the chain.

* * * * *